US006269589B1

(12) United States Patent
Bouler

(10) Patent No.: US 6,269,589 B1
(45) Date of Patent: Aug. 7, 2001

(54) PLANTER FOR TREES, POLES AND OTHER VERTICAL SURFACES

(76) Inventor: Curtis J Bouler, 130 Edwards Ave., Darlington, SC (US) 29532

( * ) Notice: Subject to any disclaimer, the term of this patent is extended or adjusted under 35 U.S.C. 154(b) by 0 days.

(21) Appl. No.: 09/371,204

(22) Filed: Aug. 10, 1999

Related U.S. Application Data

(60) Provisional application No. 60/112,218, filed on Dec. 14, 1998.

(51) Int. Cl.[7] ............................................ A01G 9/02
(52) U.S. Cl. ................................................ 47/65.5
(58) Field of Search .................... 47/23, 39, 67, 47/24, 50; 248/218.4, 219.3, 219.2

(56) References Cited

U.S. PATENT DOCUMENTS

| 58,866 | * | 10/1866 | Mendenhall | 47/24 |
|---|---|---|---|---|
| 60,951 | * | 1/1867 | Smith | 47/24 |
| 86,382 | * | 2/1869 | Faries | 47/24 |
| D. 382,511 | | 8/1997 | Azarian . | |
| 792,542 | * | 6/1905 | McLeod | 47/57 |
| 3,293,798 | | 12/1966 | Johnson, Sr. . | |
| 3,452,475 | | 7/1969 | Johnson, Sr. . | |
| 3,747,268 | * | 7/1973 | Linder | 47/39 |
| 4,419,843 | | 12/1983 | Johnson, Sr. . | |
| 5,404,672 | | 4/1995 | Sanderson . | |
| 5,438,797 | | 8/1995 | Lendel . | |
| 5,450,692 | | 9/1995 | Ruibal . | |
| 5,502,922 | | 4/1996 | Shlomo . | |
| 5,606,824 | | 3/1997 | Ruibal . | |

FOREIGN PATENT DOCUMENTS

| 375335 | * | 6/1922 | (DE) | 47/67 |
|---|---|---|---|---|
| 355567 | * | 1/1938 | (IT) | 47/24 |

* cited by examiner

Primary Examiner—Thomas Price
(74) Attorney, Agent, or Firm—Michael A. Mann; Nexsen Pruet Jacobs & Pollard LLC

(57) ABSTRACT

A planter capable of attachment at a vertical surface to a tree trunk or utility pole. The planter comprises at least one segment having an arcuate inside wall to conform to the central tree trunk or pole. Each segment extends partially around the circumference of the tree or pole. Segments may be interconnected using any one of four alternative fasteners: the first fastener is a resilient cable wrapped around a tree trunk with each segment having a pair of hooks to attach it to the cable; the second fastener interconnects segments using a pair of latches having holes therethrough with a bolt that is secured through the holes; the third fastener also interconnects segments by each segment having a pair of pins extending from the outer wall and near the end walls with a gasket having complementary holes securing the segments; and the fourth fastening means interconnects the segments using interlocking female and male edges.

11 Claims, 5 Drawing Sheets

PLANTER FOR TREES, POLES AND OTHER VERTICAL SURFACES

1. PRIORITY CLAIM

This application claims the benefit of U.S. Provisional Application No. 60/112,218, filed on Dec. 14, 1998.

2. BACKGROUND OF THE INVENTION

The present invention relates to a planter for flowers and other vegetation. In particular, the present invention relates to a planter secured to a tree, pole or other vertical surface.

3. BACKGROUND OF THE INVENTION

Flowers and other vegetation placed in planters are used to increase the aesthetic appeal of a home or business. A planter may be placed on a window ledge, hung from a rod or displayed in various other places. In landscaping, it can be important to complement a tree with a bed of flowers planted in the ground around the trunk. The contrast of a flower bed with a tree can be quite stunning; however, a planter cannot be mounted to a tree without a nail or causing other damage to the tree. Local governments also make an effort to keep an aesthetic appeal to its streets. As a part of this effort, cities hang various displays on street lights and utility poles.

Various planters have been devised over the years. In order to increase the efficient use of ground space, planters have been devised that can be vertically stacked. These planters consist of a plurality of containers that can be secured to a pole at varying elevations. The containers may be secured by simply slipping them over the top of the pole. Although these types of planters fasten to a pole, none would be suitable for fastening to a tree having branches protruding from its trunk or to a very tall pole. Therefore, there is a need for a planter that could be secured to a tree or utility pole or other vertical surface, especially one where penetrating the surface with nails, spikes, or bolts would not be required.

SUMMARY OF THE INVENTION

According to its major aspects and broadly stated, the present invention is a planter capable of attachment to a tree trunk or utility pole without the use of nails or spikes or other penetrating fasteners. Although the present planter is preferably supported by a tree or utility pole, the invention should not be limited to attachment to only these objects, but could be attached to other structures having vertical surfaces. The planter comprises at least one arcuate segment so that it can conform to a portion of the circumference of a tree trunk or pole, preferably not more than half the circumference.

Segments may be interconnected using four alternative types of fasteners: the first fastening means is a resilient cable that is wrapped around a tree trunk with each segment having a pair of hooks to allow it to be hung from the cable; the second fastening means interconnects segments by a pair of latches having holes formed therethrough with a bolt running through the holes and secured with a nut; the third fastening means also interconnects segments using pairs of pins extending from the outer walls that are held to the pins of an adjacent segments by elastic bands; and the fourth fastening means interconnects the segments using interlocking female and male edges. Segments may have spouts to be configured in a cascading manner.

A major advantage of the present invention is the ability to fasten segments of the planter to different sizes of trees or a utility pole without the use of a penetrating fastener. This advantage is created by the interconnectable segments that can surround a tree trunk or pole. As a result, a landscape designer will have more choices in picking a location to plant flowers and does not have to damage a tree to install the present planter.

An important feature of the present invention is the use of planter segments that can be interconnected to surround the tree trunk or pole. Without the use of segments having surfaces that conform to the curved tree trunk or pole, the planters will not hang well and cannot be made to surround the tree trunk. Unlike prior art planters that must be placed over the top of a pole which is impractical for a tree or tall pole, the use of segments allows the planter to be mounted to any size or height of pole or tree.

Another important feature of the present invention is the various mounting means that allow for growth of the tree trunk and avoid penetrating the trunk with spikes or nails. In one embodiment of mounting means, a resilient cable surrounds the trunk and the segments are hooked to the cable, so that the cable may expand with the growth of the trunk. Another embodiment of mounting means allows a bolt to be loosened to accommodate the growth of the trunk. Still another embodiment of fastening means uses resilient gaskets between segments so that the gaskets can expand with the growth of the trunk.

Other features and advantages of the present invention will be apparent to those skilled in the art from a careful reading of the Detailed Description of a Preferred Embodiment presented below and accompanied by the drawings.

DETAILED DESCRIPTION OF A PREFERRED EMBODIMENT

Referring now to the figures, the present invention is a planter capable of attachment to a pole or tree. Although the planter is described for attachment to a tree or utility pole, the invention should not be limited to attachment to only these objects, but could be attached to other structures having a vertical surface. However, the term "pole" will be used to indicate posts, poles, trees, columns and any other generally closed, curved surface having a generally greater vertical dimension than horizontal dimension.

Figure 4:
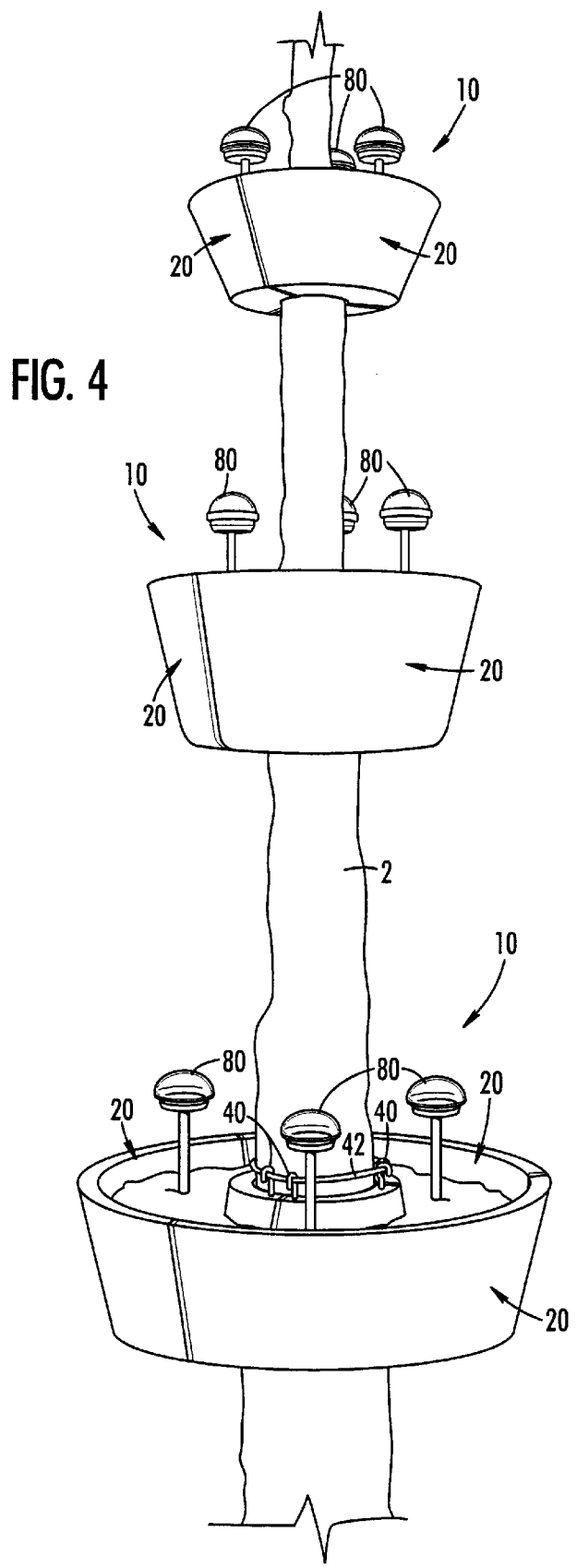
FIG. 4 is a perspective view of a plurality of planters positioned at various elevations with each planter having a plurality of segments attached to a tree trunk with a cable, according to a preferred embodiment of the present invention.
Figure 5:
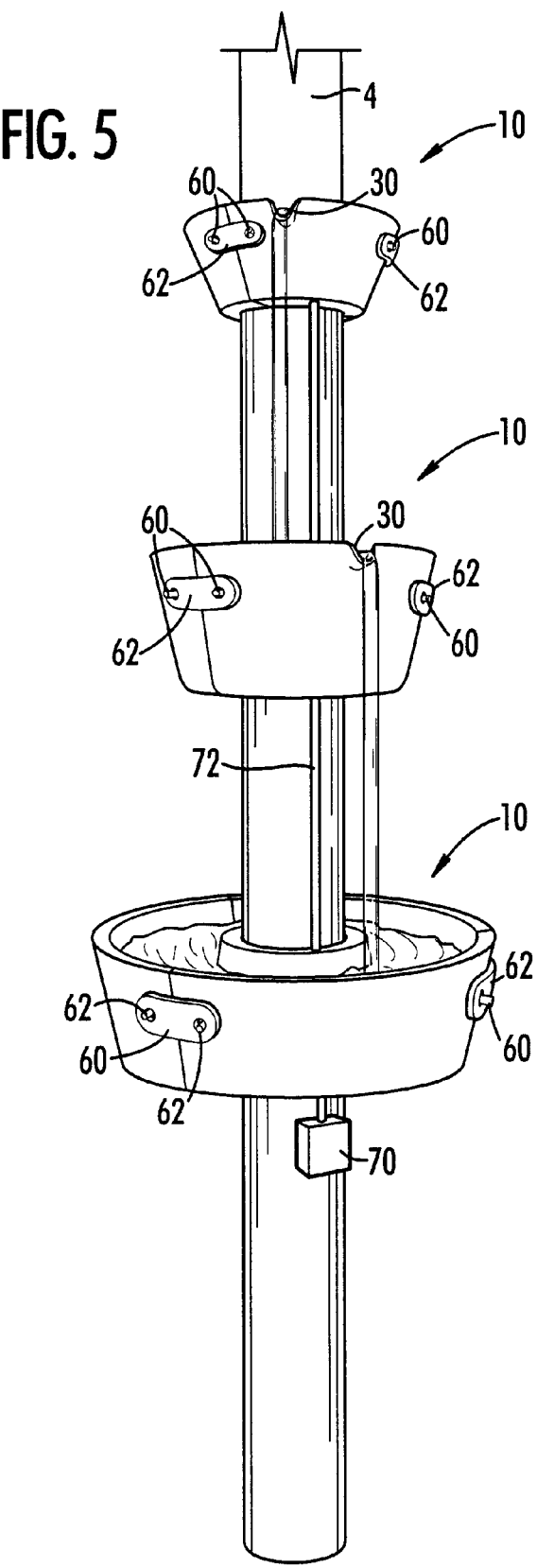
FIG. 5 is a perspective view of a plurality of planters positioned at various elevations to have cascading water flowing between planters with each planter having a plurality of segments attached to a tree trunk, according to a preferred embodiment of the present invention.

The planter, generally referred to by reference number 10, comprises at least one segment 20 having arcuate walls 24 and 26 to conform to a central tree trunk 2 or pole 4. Segments 20 may be interconnected using four alternative embodiments of fasteners, as illustrated in FIGS. 2, 3, 4 and 6. Segments may have spouts to be configured in a cascading manner as illustrated in FIG. 5.

Figure 1:
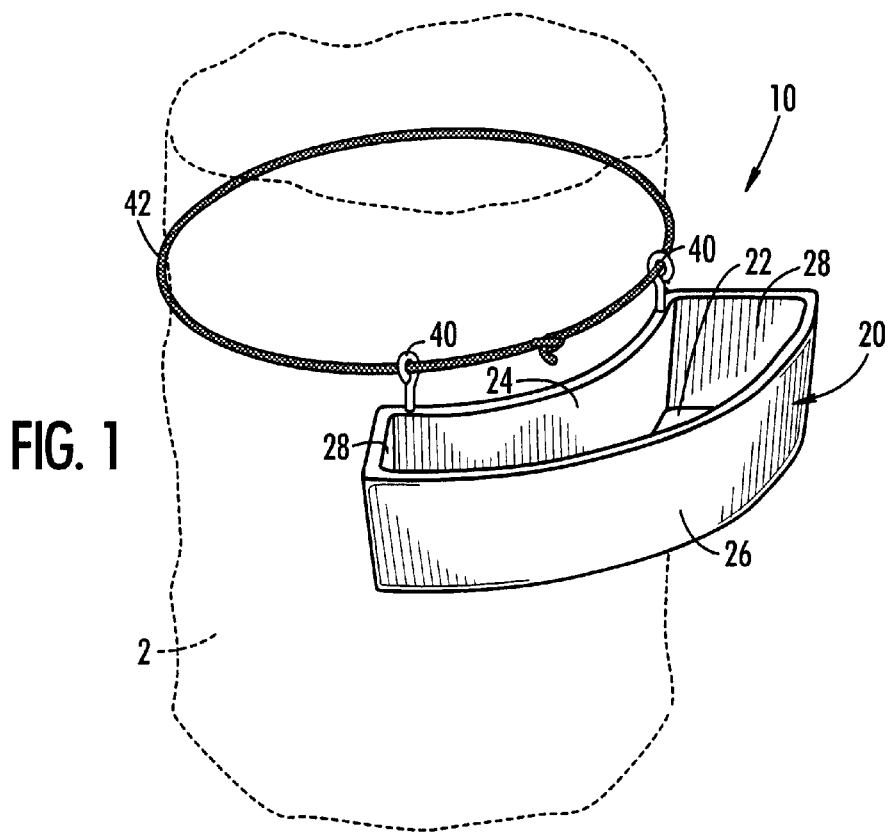
FIG. 1 is a perspective view of a planter with a single segment attached to a tree trunk using a cable, according to a preferred embodiment of the present invention.

Planter 10 is formed from at least one segment 20 as illustrated in FIG. 1. Segment 20 has a bottom wall 22, an arcuate inner wall 24, an arcuate outer wall 26, and opposing end walls 28 to create an interior space. Interior space is partially filled with a planting medium such as soil for anchoring flowers and other vegetation. Inner wall 24 has an arcuate shape so as to generally conform to curved surfaces such as tree trunk 2 or pole 4. Segment 20 carries means for fastening it to a tree trunk 2 or to other segments 20, or both, so that no penetration of tree trunk 2 or pole 4 is required.

A first preferred embodiment for attachment to a tree trunk 2 or pole 4 is illustrated in FIG. 1. A cable 42 is wrapped around a tree trunk 2 or pole 4. A pair of hooks 40 positioned preferably near end walls 28 are carried by the top of inner wall 24 for mounting segment 20. If more than one segment 20 is to be used, segments 20 can be butted against each other as illustrated in FIG. 4; also as illustrated in FIG. 4, various cables 42 can be wrapped at various elevations so that segments 20 can be mounted at various elevations. Cables 42 may be in the form of metal cables, ropes, cords, yarn, but preferably an elastic material, such as synthetic or natural rubber, so that cable 42 may expand in length as tree trunk 2 grows in diameter.

Figure 2:
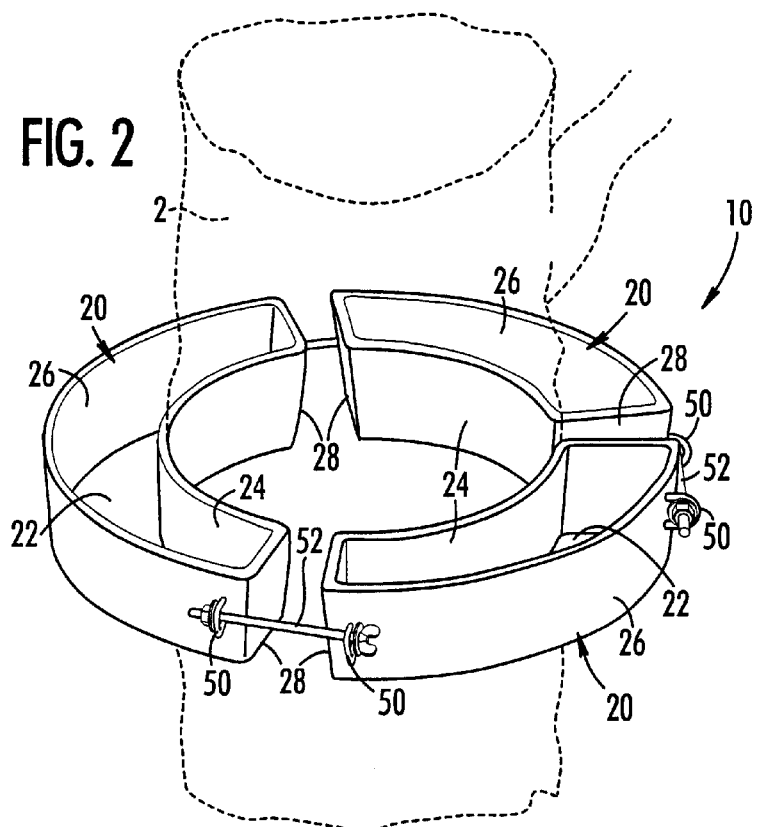
FIG. 2 is a perspective view of a planter with a plurality of segments surrounding a tree trunk using a bolt to interconnect the segments, according to a preferred embodiment of the present invention.

A second preferred embodiment for attachment of segments 20 to a tree trunk or pole is illustrated in FIG. 2. This type of attachment may be used in combination with the first preferred embodiment attachment means if segments 20 do not completely surround tree trunk or pole; in other words, this type of attachment may not be used by itself unless segments 20 completely surround tree trunk or pole. With this type of attachment means, a latch 50 having a hole therethrough extends from outer wall 26 positioned near end walls 28. Latches 50 are secured by bolt 52, which may be tightened or loosened to accommodate the size and growth of tree trunk 2. Alternatively to accommodate the growth of tree trunk 2, elastic spacers of various sizes may be added.

Figure 6:
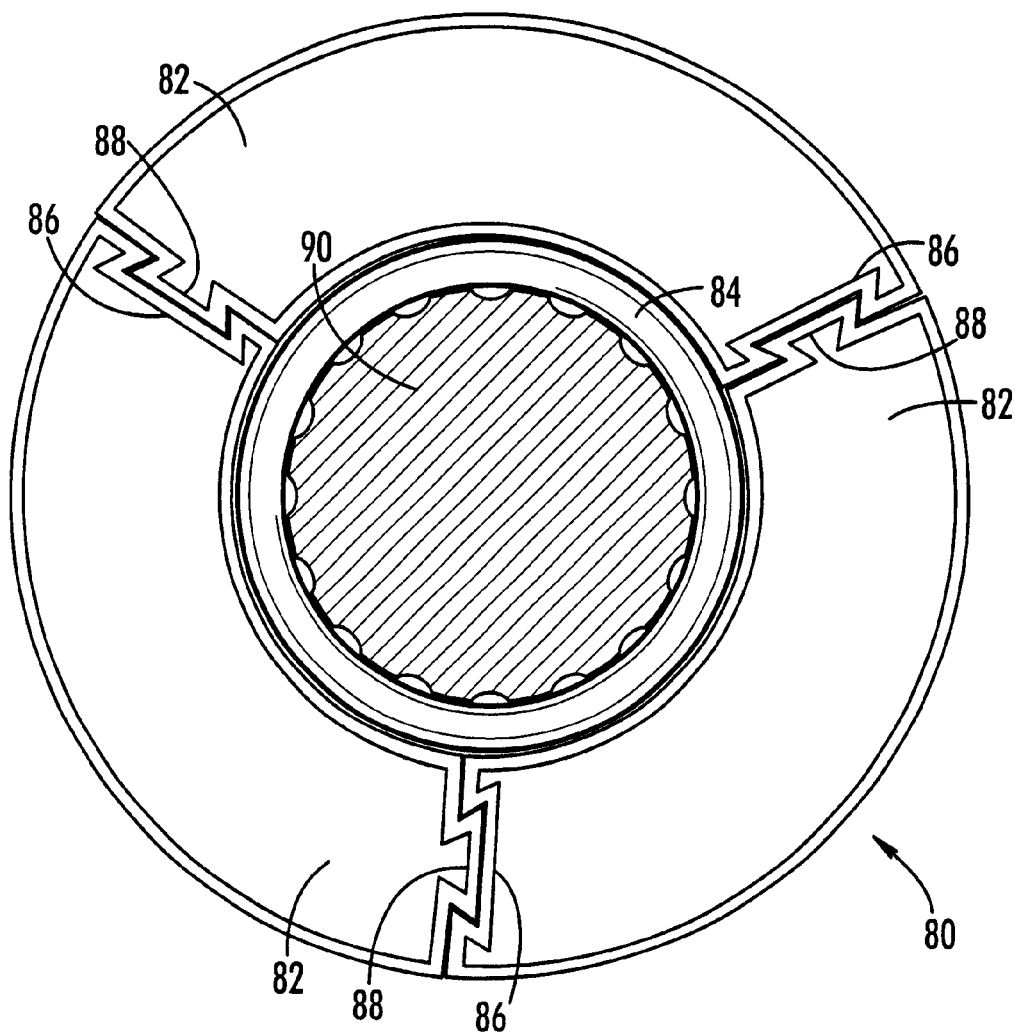
FIG. 6 is a top view of a planter with a plurality of segments surrounding a tree trunk using interlocking means, according to a preferred embodiment of the present invention.

For example, in FIG. 6, another embodiment of the present invention is shown generally indicated by reference number 80, where segments 82 are joined using interlocking segments with a male end 88 of a segment 82 joined to a female end 86 of an adjacent segment. A spacer 84 of rubber or foam or other resilient material is placed between a tree, pole or, here, a column 90 to maintain segments 82 in position. Other equivalent structural features to interlock segments would be apparent to those skilled in the construction arts.

Figure 3:
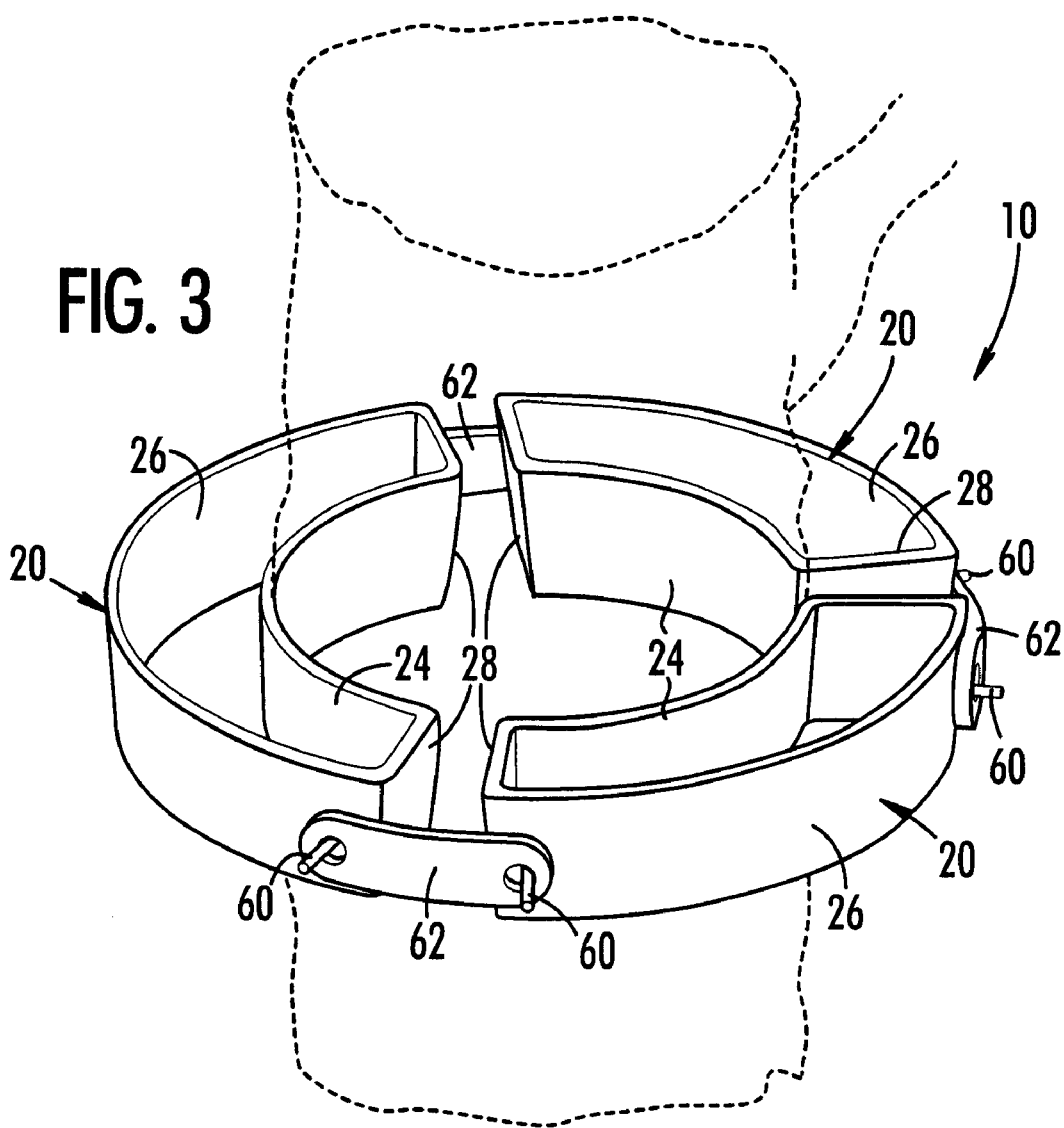
FIG. 3 is a perspective view of a planter with a plurality of segments surrounding a tree trunk using gaskets to interconnect the segments, according to a preferred embodiment of the present invention.

A third preferred embodiment for attachment of segments 20 to a tree trunk or pole is illustrated in FIG. 3. This type of attachment may be used in combination with the first preferred embodiment attachment means if segments 20 do not completely surround tree trunk 2 or pole 4; in other words, this type of attachment may not be used by itself unless segments 20 completely surround tree trunk 2 or pole 4. With this type of attachment means, a pin 60 extends from outer wall 26 positioned near end walls 28. A gasket having a pair of holes is secured by pins 60 to interconnect segments 20. Preferably gaskets 62 are formed from a resilient material so that gaskets 62 can accommodate the growth of tree trunk 2.

A segment 20 may optionally have a spout 30 to allow for cascading of water as part of an irrigation system as illustrated in FIG. 5. A pump 70 in fluid communication with the topmost planter 10 using pipe 72, continuously feeds a fluid into topmost planter 10. As topmost planter 10 overflows, the excess fluid flow is directed by spout 30 to planter 10 positioned directly below. Each lower planter 10 overflows until the bottom-most planter receives the fluid and allows the pump to feed fluid back to top-most planter 10.

In order to display the planter at night, optional lights 80 may be mounted in soil within interior surface of planter 10. Preferably, lights are photovoltaic so that no wiring to a power source is needed. Unless otherwise noted, planters 20 may be formed from plastic, wood, ceramic, clay, or various metals.

In use, a single segment 20 may be mounted to a tree trunk 2 or pole 4 by wrapping cable 42 around tree trunk 2 or pole 4 and securing hooks 40 to cable as illustrated in FIG. 1. Segments 20 may be interconnected to surround the entire tree trunk 2 or pole 4 by using latches 50 with bolts 52 as illustrated in FIG. 2 or pins 60 with gaskets as illustrated in FIG. 3. Segments 20 may be placed at differing elevations and configured with a pump 70 to create a cascading effect and automatic irrigation.

It will be apparent to those skilled in the art that many changes and substitutions can be made to the preferred embodiment herein described without departing from the spirit and scope of the present invention.

What is claimed is:

1. A planter to be connected to a pole having a circumferential surface, said planter comprising:
   at least one segment formed to have an interior space, said at least one segment having an arcuate inner wall that extends partially around a pole and engages the circumferential surface of the pole; and
   means for securing said at least one segment to the pole without penetration of the circumferential surface of the pole, wherein said securing means further comprises:
   a resilient cable adapted for fastening about the pole; and
   hooks for handing said at least one segment from said pole.

2. The planter as recited in claim 1, wherein said at least one segment is a segment that extends less than half-way around the circumferential surface of the pole.

3. A planter to be connected to a pole having a circumferential surface, said planter comprising:
   at least one segment formed to have an arcuate inner wall, two opposing end walls, a bottom wall and an outer wall, said arcuate inner wall, said opposing end walls, said bottom wall and said outer wall defining an interior space, said arcuate inner wall formed to engage a portion of the circumferential surface of a pole; and
   means for securing said at least one segment to the pole without penetration of the circumferential surface of the pole, wherein said securing means further comprises:
   a resilient cable adapted for fastening about the pole; and
   hooks for hanging said at least one segment from said pole.

4. A planter to be connected to a pole having a circumferential surface, said planter comprising:

at least one segment formed to have an arcuate inner wall, two opposing end walls, a bottom wall and an arcuate outer wall, said arcuate inner wall, said opposing end walls, said bottom wall and said arcuate outer wall defining an interior space, said arcuate inner wall formed to engage a portion of the circumferential surface of a pole; and means for hanging said at least one segment from the pole.

5. The planter as recited in claim 4, wherein said at least one segment is one segment that extends less than half way around the circumference of said pole.

6. The planter as recited in claim 4, wherein said hanging means is resilient so that it adapts to changes in the circumference of said pole.

7. The planter as recited in claim 4, wherein said at least one segment is two adjacent segments, and wherein said hanging means further comprises:

pins carried by said two adjacent segments; and elastic bands having holes dimensioned for receiving said pins so that said two adjacent segments can be fastened together by placing said bands over pins of said two adjacent segments.

8. The planter as recited in claim 4, wherein said at least one segment is two adjacent segments, and wherein said hanging means further comprises:

latches carried by said two adjacent segments; and fastening means running between said latches of said two adjacent segments.

9. The planter as recited in claim 7, wherein said hanging means further comprises gaskets between said two adjacent segments.

10. The planter as recited in claim 4, wherein said hanging means includes interlocks carried by said endwalls of said at least one segment and a spacer placed between said arcuate inner walls and said pole.

11. The planter as recited in claim 4, wherein said hanging means can be loosened to accommodate changes in the circumference of said pole.

\* \* \* \* \*